United States Patent [19]

Uehara et al.

[11] 4,417,491
[45] Nov. 29, 1983

[54] AUTOMATIC BAR MATERIAL FEEDING APPARATUS

[75] Inventors: Sukehiro Uehara, Ueda; Akio Saiki, Sakaki, both of Japan

[73] Assignees: Kabushiki Kaisha Miyano Tekkosho; Kabushiki Kaisha Alps Tool, both of Nagano, Japan

[21] Appl. No.: 358,408

[22] Filed: Mar. 15, 1982

[30] Foreign Application Priority Data

Mar. 23, 1981 [JP] Japan ............................... 56-41883

[51] Int. Cl.³ .............................................. B23B 15/00
[52] U.S. Cl. .................................... 82/2.7; 414/18; 414/748; 82/38 A
[58] Field of Search ............. 82/2.5, 2.7, 38 R, 38 A; 226/196; 414/14, 15, 16, 17, 18, 745, 748; 269/289 MR, 296; 10/162 R

[56] References Cited

U.S. PATENT DOCUMENTS

| | | | |
|---|---|---|---|
| 3,131,587 | 5/1964 | Spohn et al. | 82/2.7 |
| 3,985,221 | 10/1976 | Lueders | 82/2.7 |
| 4,179,957 | 12/1979 | Sewing | 82/38 A |
| 4,252,039 | 2/1981 | Wottler et al. | 82/83 A |
| 4,295,396 | 10/1981 | Hasslauer | 82/2.5 |

FOREIGN PATENT DOCUMENTS 2802169  7/1979  Fed. Rep. of Germany ..... 82/38 A

*Primary Examiner*—Leonidas Vlachos
*Assistant Examiner*—Jerry Kearns
*Attorney, Agent, or Firm*—Ladas & Parry

[57] ABSTRACT

In an apparatus for automatically feeding bar stock material into a numerically-controlled automatic lathe, a bar is rotatably clamped and borne by the clamp jaws of several bearing clamps disposed in a row at intervals along the bar and orientated at respectively different angles about the bar, each clamp jaw comprising three pulleys in triangular formation and an endless belt supported on these pulleys, one of which is driven, the bar being clamped between a span of the belt between two pulleys of one jaw and that of the other jaw of each bearing clamp. The bar is thus held at clamping positions that vary helically about the bar as it is fed by a feed pipe into the lathe.

4 Claims, 11 Drawing Figures

AUTOMATIC BAR MATERIAL FEEDING APPARATUS

BACKGROUND OF THE INVENTION

This invention relates to an automatic bar feeding apparatus for feeding long bar stock material automatically into a machine tool, particularly a numerically-controlled automatic screw machine or a lathe.

In recent years, there has been a demand for ever increasing speeds of main spindles and for ever improving precision in machining in numerically-controlled automatic screw machines or automatic lathes, numerically-controlled lathes, and the like which are automatically controlled.

In these machine tools, machining of bar material is frequently carrried out, and in these times of intensive trend toward automation and unmanned operations, it is the general practice to carry out the feeding of bar material for machining by means of an automatic bar material feeding apparatus.

In the machining operation of these machines of cutting the bar material, however, there arise several causes of impairment of machining precision at the time of cutting such as the noise of rotation of the bar material, vibration due to action of transverse vibration accompanying the bar rotation, and chattering due to inadequate gripping by the spring collet.

Particularly the greatest factor impeding the increases in speed and improvements in precision of these machines in the machining of bars is the motional behavior of the rotating bar material undergoing machining.

Accordingly, in order to increase the machining speed and improve the machining precision of these machines, an automatic bar material feeding apparatus to operate in conjunction with these machines is required to fully control the rotational behavior of the bar material affecting the machining precision thereof.

SUMMARY OF THE INVENTION

It is an object of this invention to provide an automatic bar material feeding apparatus for automatically feeding bar material to a machine tool, in which apparatus noise generated by the rotation of the bar material is suppressed, and at the same time the transverse vibration of the bar material is held to a minimum thereby to make possible the operation of the machine tool at high speed with high precision.

According to this invention, briefly summarized, there is provided an apparatus for automatically feeding into a machine tool bar stock material for machining thereof, the apparatus having: a stock table for holding thereon a number of bars; openable and closeable bearing means; means for supplying the bars, one at a time, from the stock table to the bearing means to be rotatably borne thereby in coaxial alinement with the main spindle of the machine tool, the bearing means extending from one end to the other end thereof over most of the length of the bar thus borne; and a feed pipe with a feed chuck for gripping the end remote from the machine tool of the bar thus borne and successively feeding the bar into the machine tool as the machining progresses, the bearing means comprising a plurality of bearing clamps disposed sequentially at intervals along the borne bar and each comprising a pair of openable and closeable clamping jaws each having an endless belt rotatably supported on rotatable pulleys, the borne bar being elastically clamped between the two belts of the clamping jaws of each bearing clamp, the apparatus being characterized by: a first mechanism provided for each bearing clamp for varying the angular position of the clamp about the borne bar and functioning to cause the directions of the clamping forces of the bearing clamps on the borne bar to be respectively different; and a second mechanism for opening and closing the clamping jaws of each bearing clamp and functioning so that, as the feed chuck advances, the bearing clamps successively approached thereby are successively opened to release the bar and become clear of the path of the feed chuck, the first and second mechanisms being unitized for each bearing clamp.

The nature, utility, and further features of this invention will be more clearly apparent from the following detailed description with respect to a preferred embodiment of the invention when read in conjunction with the accompanying drawings, briefly described below.

DETAILED DESCRIPTION OF THE INVENTION

Figure 1:
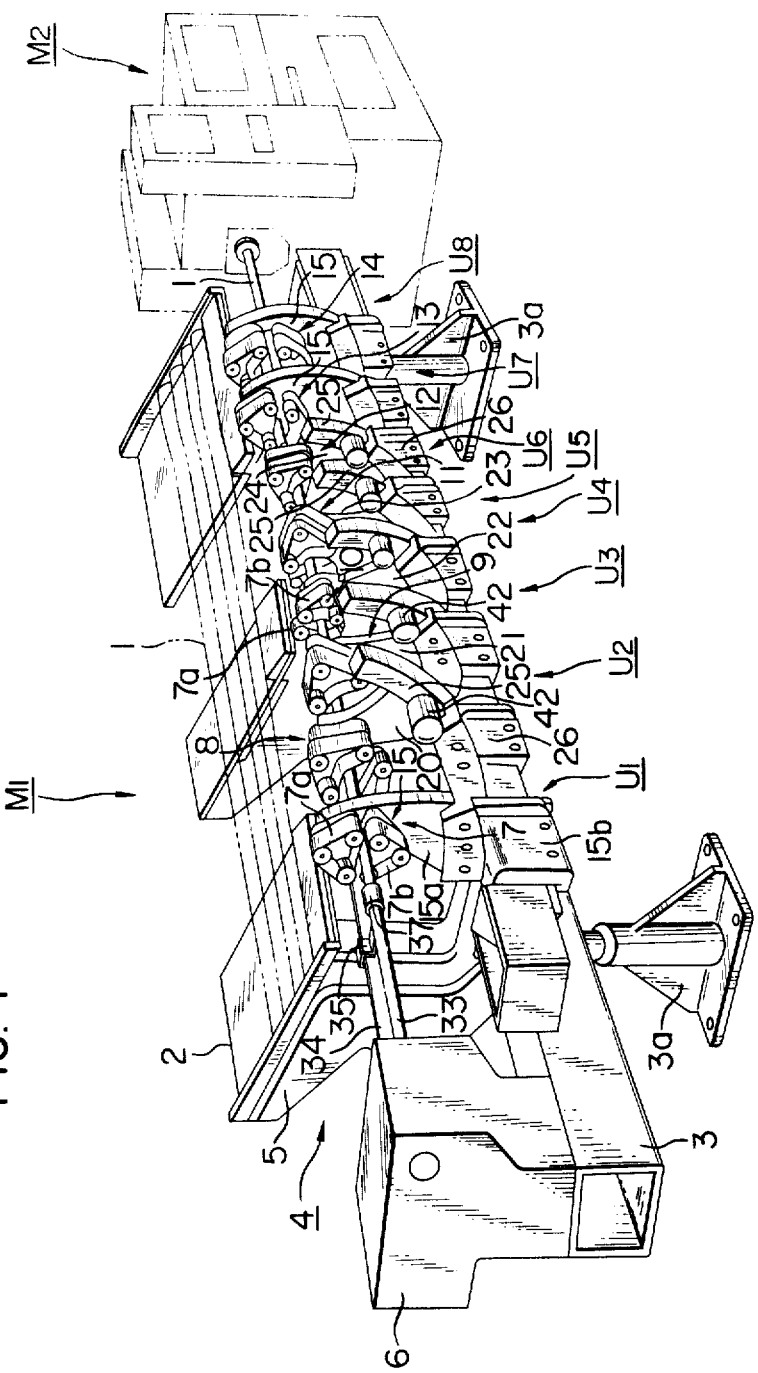
FIG. 1 is a perspective view of an example of the automatic bar material feeding apparatus according to this invention as viewed from its upstream end.

Referring first to FIG. 1, an automatic bar feeding apparatus $M_1$ of this invention is installed adjacently to, and in axial alinement with, a bar material machining machine $M_2$ such as a numerically-controlled automatic screw machine or automatic lathe or a numerically-controlled lathe and operates to feed bar stock material 1 successively into the machine $M_2$.

This automatic bar feeding apparatus $M_1$ comprises, essentially: a rigid main frame 3 comprising a hollow tubular structure of rectangular cross section supported on frame legs 3a, 3a and extending in the direction of the main spindle of the machining machine $M_2$; a sloping stock table 2 comprising three spaced-apart parts lying in the same plane and functioning to receive and hold several bars 1 in parallel state to be successively supplied to bearing units, the stock table 2 being supported on the main frame 3; a plurality of the bearing units $U_1, U_2, \ldots U_8$ mounted on, and at constant space intervals along, the main frame 3 and operating to receive in succession one bar 1 at a time supplied from the stock table 2 and to bear the bar coaxially with the main spindle of the machining machine $M_2$; and a feed mechanism 4 for successively feeding cut off portions of the bar 1 borne by the bearing units in synchronism with the bar cutting operation into the machining machine $M_2$.

Each of the parts of the stock table 2 is supported on a support frame 5 mounted on the main frame 3. On the rear or upstream end of the main frame 3 is mounted a feed box 6 accommodating a driving mechanism for actuating the feed mechanism 4.

The above mentioned bearing units $U_1, U_2, \ldots U_8$ have, at their upper parts, bearing clamps 7, 8, ... 14, respectively, which are openable and closeable for clamping the bar 1 and constitute bearing parts for bearing the bar 1. Each of these bearing clamps comprises clamping jaws 7a and 7b which are openable and closeable in the manner of a bivalve shell.

Figure 2:
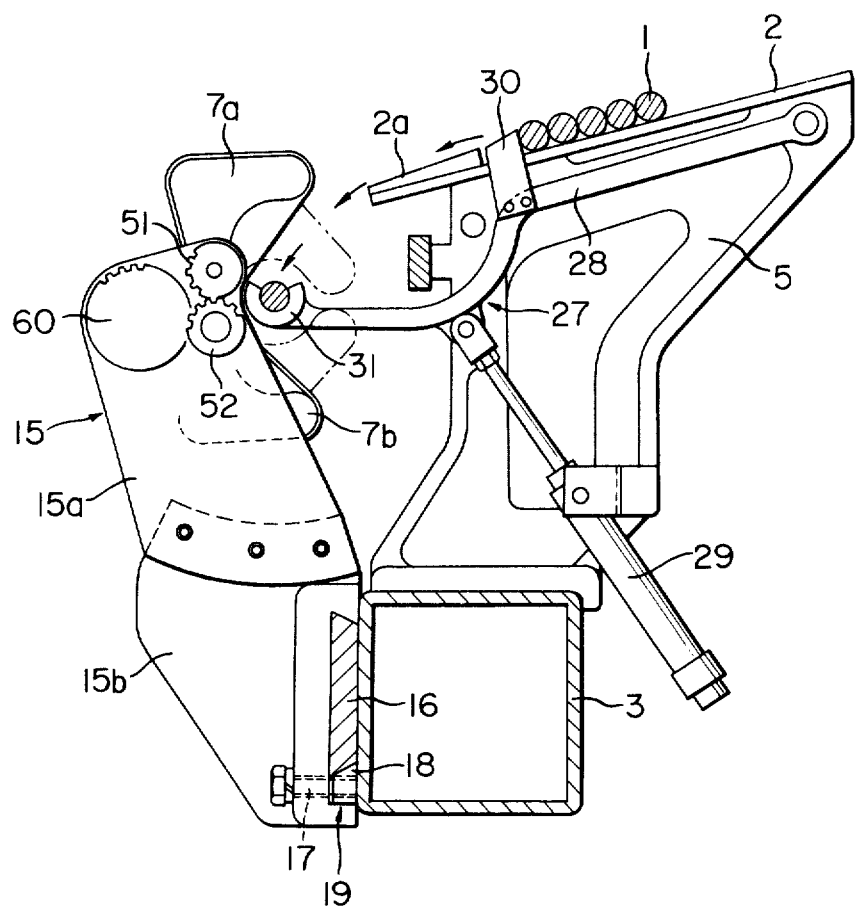
FIG. 2 is an elevation, with some parts shown in vertical section, of a first bar-bearing unit disposed furthest upstream in the apparatus, as viewed upstream.

The bearing clamps 7, 13, and 14 of the bearing units $U_1, U_7$, and $U_8$ at the upstream and downstream sides are supported on the upper ends of fixed brackets 15, 15, 15, each of which comprises an upper bracket 15a and a lower bracket 15b as shown in FIG. 2. The lower bracket 15b is secured to the main frame 3 by a dovetail-joint engagement at a dovetailed part 16, at the lower part of which a tightening part 19 comprising fixing bolts 17 and a tightening member 18 is provided.

Figure 3:
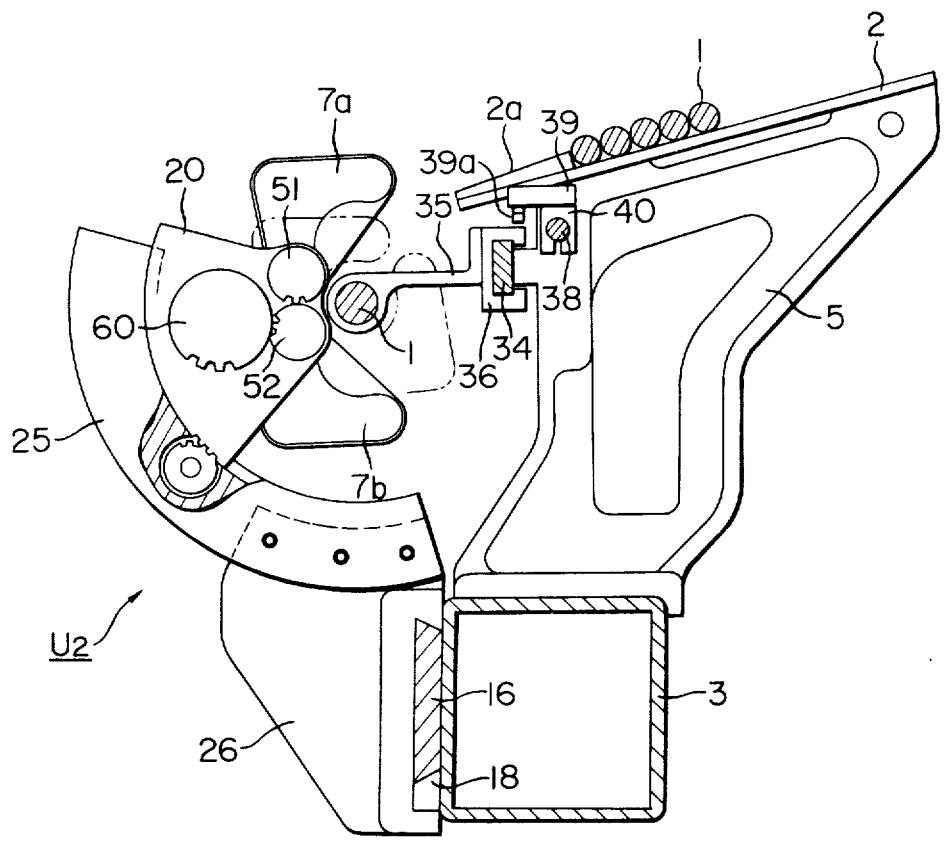
FIG. 3 is a similar elevation of a second bar-bearing unit disposed adjacently downstream from the first bar-bearing unit.

The bearing clamps 8, 9, ... 12 of the remaining intermediate bearing units $U_2, U_3, \ldots U_6$ are mounted on shiftable sectors 20, 21, ... 24, respectively. As shown in FIG. 3, each of these shiftable sectors is slidably supported on an arcuate guide plate 25, which is fixedly mounted on a bracket 26 of the same construction as the above mentioned lower bracket 15b.

Each of the aforementioned support frames 5, as shown in FIG. 2, is provided with a bar supply device 27 for supplying the bars on the stock table 2 one at a time to the bearing position at the time of bar machining. This bar supply device 27 comprises a handling arm 28 pivoted at its one end on the support frame 5 near the outer end (right-hand end as viewed in FIG. 2) of the stock table 2 and an air cylinder 29 for actuating the handling arm 28 in swinging movement. The handling arm 28 has, at an intermediate part thereof, a projection 30 projecting upward and also, at its other free end, a bar receiving part 31. As a result of the extending and contracting movements of the air cylinder 29, the upper part of the projection 30 is caused to project above and descend below the upper surface of the stock table 2 thereby to send the bars 1 on the stock table 2 successively, one at a time, to the bar receiving part 31.

As shown in FIGS. 1 and 3, the aforementioned feed mechanism 4 has a feed pipe 33 extending in the downstream direction from the feed box 6, a guide rail 34 secured to the upper inner surfaces of the support frames 5 in order to propel the feed pipe 33 in accordance with the cutting of the bar 1 by the machining machine $M_2$, and a coupling member 35 for coupling the feed pipe 33 to the guide rail 34. A sliding frame 36 secured to one end of the coupling member 35 is slidably engaged with the guide rail 34. This sliding frame 36 is coupled to an endless chain (not shown), which is provided over substantially the entire length of the bar feeding apparatus $M_1$ and is driven by a servomotor (not shown).

The feed pipe 33 is provided at its downstream end with a feed chuck 37 adapted to firmly hold the upstream end of each bar 1.

Close to and parallel to the guide rail 34, a mounting bar 38 is horizontally secured to the upper inner part of the support frames 5. At an appropriate position on this mounting bar 38, there is fixedly mounted a limit switch 39 by way of a fixing member 40. This limit switch 39 has an actuator 39a, which is adapted to be operated by the above mentioned sliding frame 36.

Figure 4:
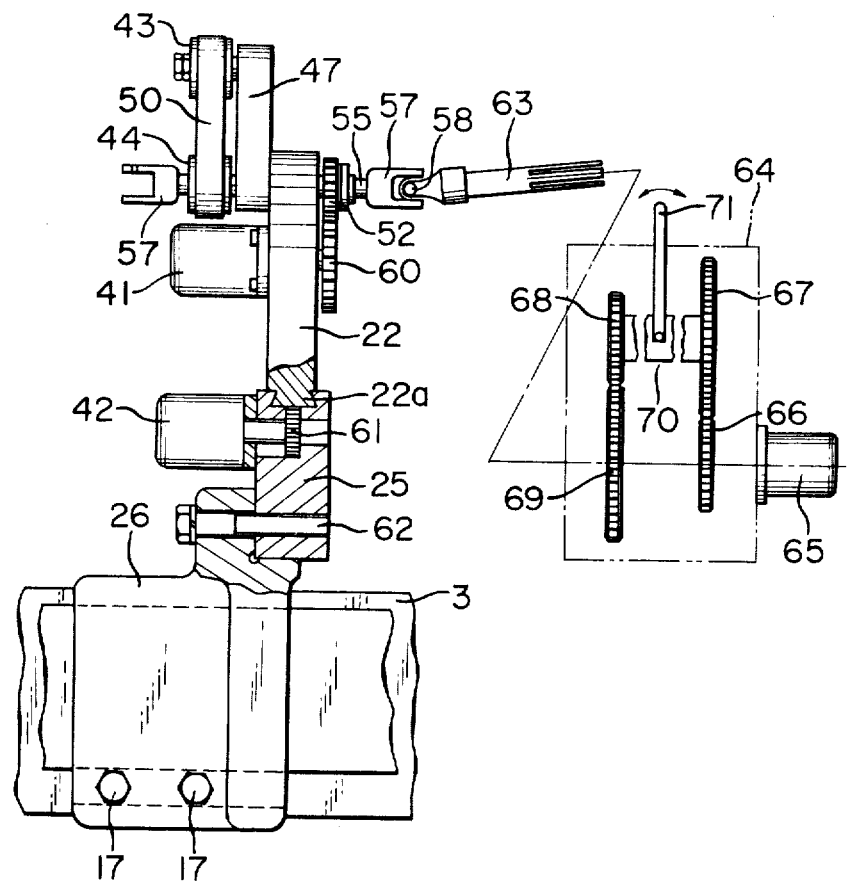
FIG. 4 is a combination of a side elevation, with parts shown in vertical section, of a fourth bar-bearing unit and a schematic view of a transmission, including a clutch, installed between a motive power source and the unit.

As described more fully hereinafter, the limit switch 39 operates during the advance of the feed pipe 33 to control servomotors 41 (not shown in FIG. 1) mounted on the arcuate guide plates 25 for shifting the shiftable sectors 20, 21, ... 24 so that the bearing clamps 7, 8, ... 14 will assume positions where they will be clear of, and not interfere with, the advance of the feed pipe 33 and to control servomotors 42 mounted, as shown in FIG. 4, on the upper brackets 15a and the shiftable sectors 20, 21, ... 24 and operating to open the bearing clamps 7, 8, ... 14.

Figure 5:
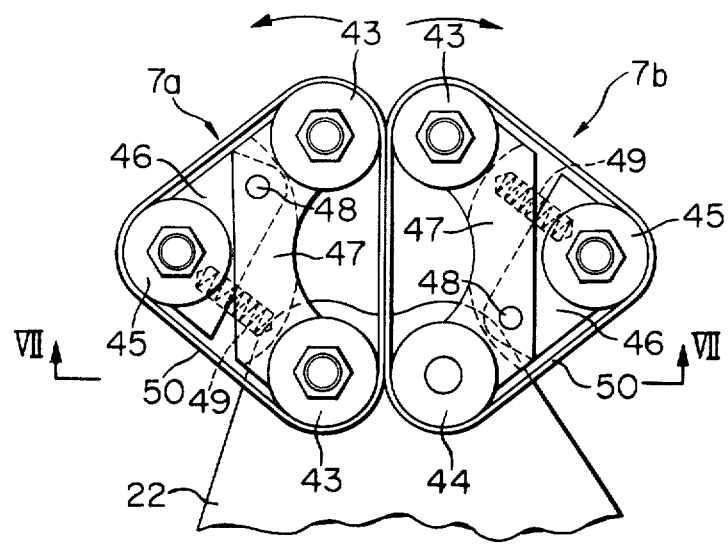
FIG. 5 is an elevation showing the upper part of the fourth bar-bearing unit as viewed upstream.
Figure 6:
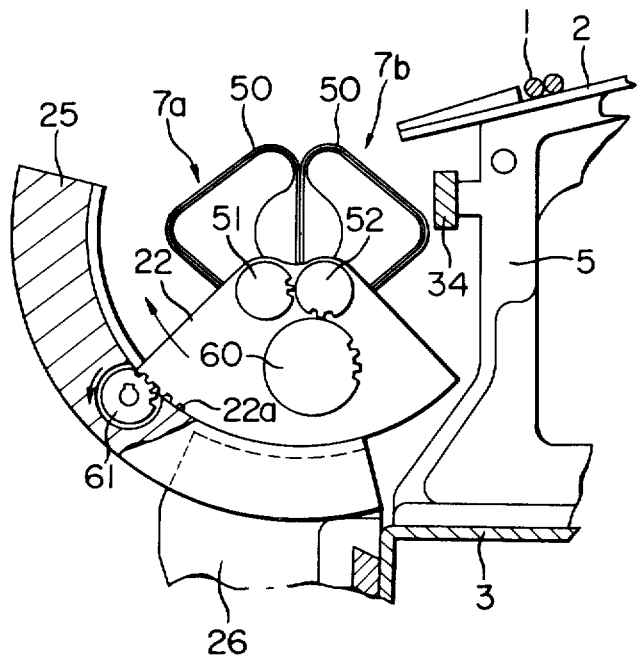
FIG. 6 is an elevation, with parts cut away and parts shown in vertical section, of the fourth bar-bearing unit as viewed upstream.

The bearing clamps 7, 8, ... 14 form bearing parts for receiving the bar 1 supplied thereto. The construction of the respective pairs of clamping jaws of the bearing clamps are the same in all of the bearing units $U_1, U_2, \ldots U_8$. For example, the unit clamping jaws 7a and 7b of the bearing unit $U_4$ are as shown in FIGS. 5 and 6.

Specifically, each of the clamping jaws 7a and 7b has three rotatable pulleys disposed in spaced apart arrangement to form an isosceles triangle. The bases of the two isosceles triangles of the clamping jaws 7a and 7b are disposed parallelly and close together in symmetrical arrangement. The rotatable pulleys at the base of the triangle of the jaw 7a are guide pulleys 43, 43, and those at the base of the triangle of the jaw 7b are a guide pulley 43 and a drive pulley 44, respectively. The pulleys at the vertices of the two triangles are idler pulleys 45, 45.

Each of these idler pulleys 45, 45 is rotatably mounted on one end of a respective swingable arm 46, which is pivoted near its other end by a pivot pin 48 on a support plate 47 rotatably supporting the other two pulleys of that clamping jaw. A compression spring 49 is interposed in compressed state between each swingable arm 46 and the corresponding support plate 47 thereby to impart tension to an endless belt 50 passed around the three rollers of that clamping jaw.

The edge of each support plate 47 facing the above mentioned base of the triangle of pulleys is made arcuately concave. When the two clamping jaws 7a and 7b are swung together in clamping action, the spans of the two belts 50 at the bases of their triangles are brought into mutual contact, and the bar 1 is elastically clamped between these spans of the belts 50 at this base part.

Figure 7:
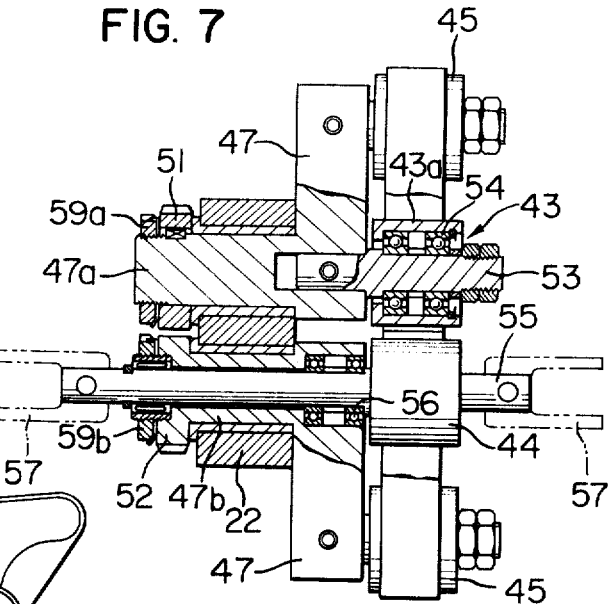
FIG. 7 is a sectional view, with parts cut away, taken along the plane indicated by line VII—VII in FIG. 5 as viewed in the arrow direction.

The two opposed support plates 47 respectively have shafts 47a and 47b passed through the inner end of the shiftable sector 22 as shown in FIG. 7. A gear 51 is fixed to the outer end of the shaft 47a, while a gear 52 meshed with the gear 51 is fixed to the outer end of the shaft 47b. These gears 51 and 52 are respectively held fixedly in place by tightened retaining members 59a and 59b on their shafts 47a and 47b.

Each of the above mentioned guide pulleys 43 and idler pulleys 45 comprises, for example, a rotatable ring 43a rotatably mounted by way of a bearing 54 on a fixed shaft 53 fixedly secured to the support plate 47 having the shaft 47a. The drive pulley 44 is fixedly mounted on a drive shaft 55 passed through the other support plate 47 and coaxially through the shaft 47b. The drive shaft 55 is rotatably supported by way of a bearing 56 on this support plate 47.

A coupling clevis or yoke 57 is fixedly secured to each end of the drive shaft 55, and a universal joint 58 for transmitting driving power, as shown in FIG. 4, is coupled to each coupling yoke 57.

As shown in FIGS. 4 and 6, the above mentioned gear 52 is meshed with a driving gear 60, which is driven by the aforementioned servomotor 41 mounted on the opposite side of the shiftable sector 22. When this servomotor 41 is operated, the gear 52 rotates, and the gear 51 also rotates simultaneously, whereby the two opposed support plates open or close.

The shiftable sector 22 is provided at its arcuate edge with gear teeth 22a, which are meshed with a pinion 61 rotatably supported in built-in state within the corresponding arcuate guide plate 25. This pinion 61 is fixedly mounted on the output shaft of the aforementioned servomotor 42. The arcuate guide plate 25 is fixed by a fixing screw 62 to the bracket 26.

The above mentioned universal joint 58 is connected to one end of a power transmitting shaft 63, the other end of which is coupled via a speed-changing gear mechanism or transmission 64 with a clutch to motive power source 65. The transmission 64 comprises gears of different diameter such as gears 66, 67, 68, and 69 and a clutch 70 disposed between the gears 67 and 68 and actuated by a clutch lever 71. By manipulating the clutch lever 71, the rotational speed of the belts 50 of the clamping jaws 7a and 7b can be controlled, or the transmission of driving power from the outside to the drive pulley 44 can be completely cut off.

The motive power source 65 may be a part of the power source system of the machining machine $M_2$, or it may be a separate power source. By intercoupling the drive pulleys 44 of all bearing units by means of universal joints and torque shafts, the belts 50 of all clamping jaws 7a and 7b can be caused to rotate at a constant speed.

Figure 8:
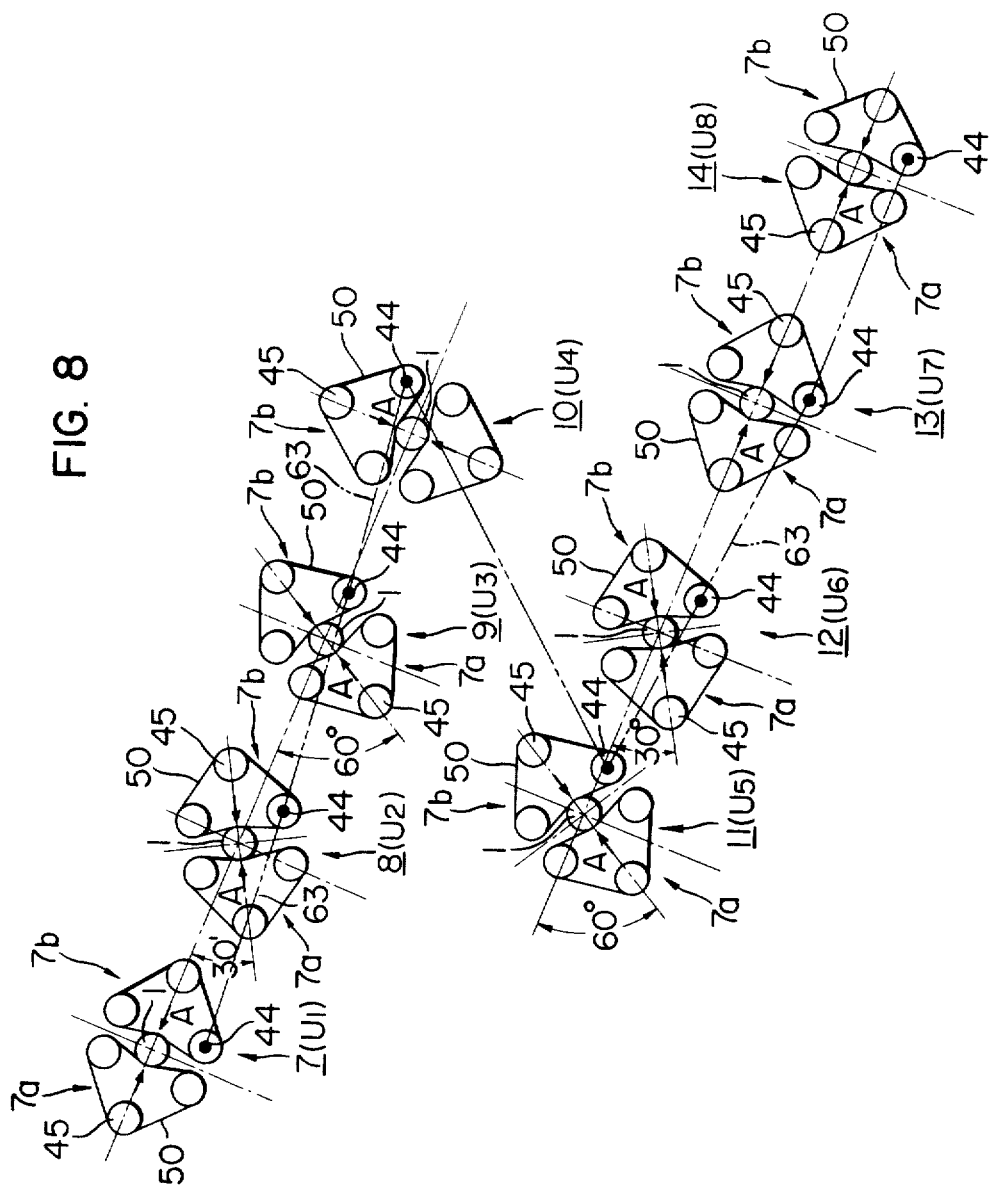
FIG. 8 is a diagram indicating relative orientations of eight bearing clamps about a bar being clamped and borne thereby.

The directions in which the bearing clamps 7, 8, ... 14 clamp the bar 1 are made respectively different in order to achieve the objects of this invention. For example, by arranging the respective clamping jaws 7a and 7b of the bearing units $U_1$, $U_2$, ... $U_8$ as indicated in FIG. 8, transverse vibration of the bar can be effectively prevented. More specifically: the clamping direction of the belts 50 of the bearing unit $U_1$ with respect to the bar 1 (as indicated by arrows A) is in the vertical direction, as a supposition; then that of the belts 50 of the bearing unit $U_2$ is inclined 30 degrees of angle in the counterclockwise direction from the first, or vertical, direction; that of the belts 50 of the bearing unit $U_3$ is inclined 60 degrees in the counterclockwise direction from the first direction; and that of the belts 50 of the bearing unit $U_4$ is horizontal or perpendicular to the vertical direction.

Furthermore, the clamping direction in the bearing unit $U_5$ is the same as that in the bearing unit $U_3$; that in the bearing unit $U_6$ is the same as that in the bearing unit $U_2$; and those in the bearing units $U_7$ and $U_8$ are in the vertical direction.

The drive pulleys 44 of all bearing units are coupled by the aforementioned transmitting shaft 63, which is arranged in a helical state around the bar 1 being held. Furthermore, a line joining the contact surfaces between the belts 50 of all bearing units and the bar 1 assumes a helical figure. That is, the clamping directions of the belts 50 vary in a helical manner.

Figure 9:
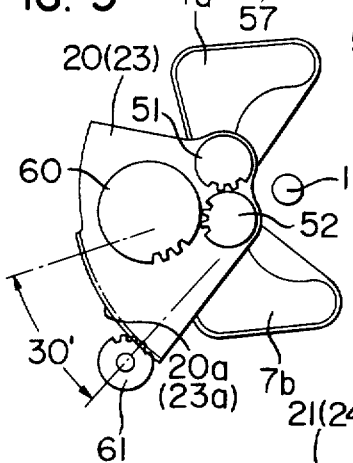
FIGS. 9, 10, and 11 are elevations, as viewed upstream, respectively showing shiftable sectors and opened bearing clamps of representative bar-bearing units.
Figure 10:
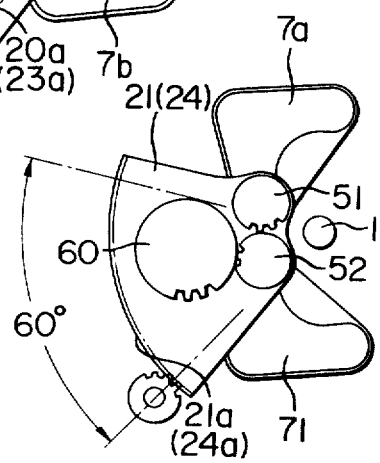
Figure 11:
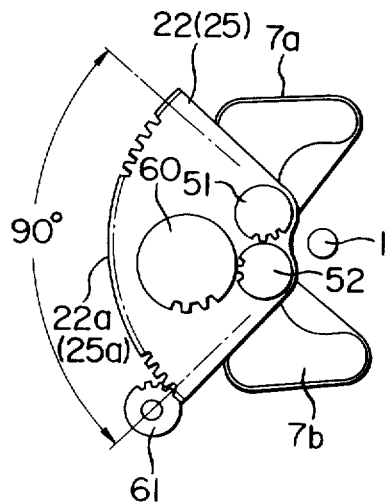

Since the mounting positions of the clamping jaws 7a and 7b of the bearing units are respectively different, there is a possibility of a part of the bearing clamps interfering with the advance thereof when the aforementioned feed pipe 33 advances toward the machining machine $M_2$. For this reason, it is necessary to cause the clamping jaws 7a and 7b of the bearing units $U_2$, $U_3$, ... $U_6$ to shift to standard positions as indicated in FIGS. 9, 10, and 11 (i.e., same positions of bearing units $U_1$, $U_7$, ... and $U_8$) as the feed pipe 33 advances.

More specifically, in the bearing units $U_2$ and $U_6$, it is necessary when the feed pipe 33 is to be passed by them to rotate the shiftable sectors 20 and 24 through 30 degrees of angle in the clockwise direction thereby to open their clamping jaws 7a and 7b. For this purpose, gear teeth 20a and 24a are formed over an arc of 30 degrees along the arcuate peripheral edge of the shiftable sectors 20 and 24, respectively.

Furthermore, in the bearing units $U_3$ and $U_5$, it is necessary to rotate the shiftable sectors 21 and 25 through 60 degrees in the clockwise direction from the bearing positions of the clamping jaws thereof. For this purpose, gear teeth 21a and 25a are formed over arc of 60 degrees along the arcuate peripheral edge of the shiftable sectors 21 and 25. For the same reason, gear teeth 22a are formed over an arc of 90 degrees along the arcuate peripheral edge of the shiftable sector 22 of the bearing unit $U_4$.

The automatic bar feeding apparatus of the above described construction according to this invention is operated and functions in the following manner.

When a specific number of bars 1 are supplied onto the stock table 2, the leading bar 1 comes into contact with the nearest edge of an inclined engagement plate 2a mounted at the inner edge of the stock table 2 and stops in this state. Since the piston of the air cylinder 29 is retracted at this time, the projection 30 is in its lowered position. When the piston of the air cylinder 29 is then caused to project outward, the projection 30 flips up the leading bar 1, whereupon this leading bar 1 moves along the upper surface of the engagement plate 2a and drops into the bar receiving part 31 of the handling arm 28, where the bar 1 is in axial alinement with the main spindle of the machining machine $M_2$.

Prior to the supply of the bar 1 to its bearing position as described above, the shiftable sectors 20 through 24 of the bearing units $U_2$ through $U_6$ are driven by the servomotor 42 to shift so that the bearing clamps 8 through 12 assume the same standard positions as the bearing units $U_1$, $U_2$, and $U_3$. Simultaneously, the servomotor 41 also operates to open the unit clamping jaws 7a and 7b.

Then, after the bar 1 has assumed this state wherein it is being borne by the handling arm 28, the feed pipe 33 advances from the feed box 6, and its feed chuck 37 grips the upstream end of the bar 1. At the same time, the bearing clamps 9 through 12 of the bearing units $U_2$ through $U_6$ rotate to their respective bearing positions, as indicated in FIG. 8, and grip the bar 1 in a helical state at different positions.

Then, when preparation for machining of the bar 1 is completed in this manner, the operation of the machining machine $M_2$ is started, and the bar 1 starts to rotate.

Then, since the bar 1 is borne by the bearing clamps 7 through 14 in a helical state as described above, transverse vibrations of the bar 1 in various transverse directions are positively controlled and prevented. Therefore, the rotational speed of the bar 1 and the machining speed can be made high.

Then, by operating the motive power source 65 to rotate the driving pulleys 44 of all clamping jaws 7b through the transmission 64 in unison with the rotational speed of the bar 1, the friction between the bar 1 and the belts 50 can be decreased, and the serviceable life of all related parts can be prolonged. However, depending on the circumstances such as that when the bar 1 is heavy, it may be more advantageous to disengage the clutch 70 and let the belts 50 be driven.

When the machining of the bar 1 progresses, and a specific length thereof is cut off, it is necessary to advance the feed pipe 33 thereby to insert a new part of the bar 1 into the machining machine $M_2$. At this time, when the feed pipe 33 comes to points closely approaching each of the mating bearing clamps 7 through 14, the corresponding sliding frame 36 activates the limit switch 39, as indicated in FIG. 3, whereby operational signals are sent to the servomotors 41 and 42 (FIG. 4), and the bearing clamps approached by the feed pipe are returned to the standard position, the clamping jaws 7a and 7b being opened at the same time.

As the bar 1 becomes successively shorter in this manner, the bearing clamps are sequentially opened at their standard positions, and each set of bearing clamps which the feed pipe 33 passes is stopped in the state wherein it has been opened at its standard position.

When the machining of one bar 1 is completed, the feed pipe 33 returns to its original position. At this time, the last short piece of the bar 1 which has been machined is knocked out of the feed chuck 37 by a knockout rod (not shown) provided in the feed pipe 33. In this manner the machining process of one length of the bar 1 is completed, and the preparation for bearing the succeeding bar 1 is finished. Thereafter, the succeeding bar 1 is supplied by the action of the handling arm 28 to the bearing position, and the same feeding operation as described above is carried out.

Because of the construction and operation of the automatic bar feeding apparatus according to this invention as described above, transverse vibration of the bar undergoing machining is positively suppressed, and moreover generation of noise arising from the rotation of the bar can be prevented, whereby the machining speed and precision of the machine into which the bar is being fed are greatly improved.

What is claimed is:

1. In an apparatus for automatically feeding into a machine tool bar stock material for machining thereof, the apparatus having: a stock table for holding thereon a number of bars; openable and closeable bearing means; means for supplying the bars, one at a time, from the stock table to the bearing means to be rotatably borne thereby in coaxial alinement with the main spindle of the machine tool, the bearing means extending from one end to the other end thereof over most of the length of the bar thus borne; and a feed pipe with a feed chuck for gripping the end remote from the machine tool of the bar thus borne and successively feeding the bar into the machine tool as the machining progresses, the bearing means comprising a plurality of bearing clamps disposed sequentially at intervals along the borne bar and each comprising a pair of openable and closeable clamping jaws each having an endless belt rotatably supported on rotatable pulleys, the borne bar being elastically clamped between the two belts of the clamping jaws of each bearing clamp, the improvement comprising:
   a first mechanism provided for each bearing clamp for varying the angular position of the clamp about the borne bar and functioning to cause the directions of the clamping forces of the bearing clamps on the borne bar to be respectively different; and
   a second mechanism for opening and closing the clamping jaws of each bearing clamp and functioning so that, as the feed chuck advances, the bearing clamps successively approached thereby are successively opened to release the bar,
   the first and second mechanisms being unitized for each bearing clamp.

2. The improvement according to claim 1 in which said directions of the clamping forces are caused by the first mechanism to vary sequentially by a constant angle about the axis of the borne bar from the one end of the bearing means to the other, whereby the angular positions of the parts of the bar contacted by the belts of the successive bearing clamps lie along a helical path along the bar.

3. The improvement according to claim 1 or 2 in which one of the rotatable pulleys of each bearing clamp is driven in rotation by driving power transmitted thereto from an outside motive power source.

4. The improvement according to claim 3 in which the rotatable pulleys thus driven of all bearing clamps are successively coupled by universal joints and torque shafts.

* * * * *